United States Patent Office 2,813,086
Patented Nov. 12, 1957

2,813,086

SULFUR-CONTAINING CROSSLINKED POLYESTER ELASTOMERS

Paul Robitschek, Buffalo, and George C. Schweiker, Niagara Falls, N. Y., assignors to Hooker Electrochemical Company, Niagara Falls, N. Y., a corporation of New York No Drawing. Application May 4, 1954,
Serial No. 427,679

12 Claims. (Cl. 260—45.4)

This invention relates to new elastomeric compositions and to methods for their preparation, comprising a polymerizable mixture of an unsaturated polyester and an ethylenic cross-linking agent, the acid component of the linear polyester portion of said mixture including chemically combined sulfur in the form of an

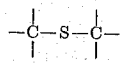

linkage in the molecule, and to the addition type polymerized resins produced therefrom.

The production of rubber-like materials which are solvent-resistant and which possess a reasonable balance of the physical and chemical properties required for their commercial application as adhesives, potting compounds for aircraft applications, sealants for fuel tanks and other containers, gaskets, tubings, coatings, binders, putties or caulking materials, etc. is a long standing problem of significant commercial importance.

Various attempts in meeting the demand for oil or solvent-resistant elastomers for these and related purposes have been made. For example, as is well-known in the art, elastomeric co-polymers of acrylonitrile and butadiene are now marketed and these have a limited degree of organic solvent resistance. The problem has also been approached by special compounding of conventional elastomers; however, these have not been entirely satisfactory.

A synthetic elastomer having a higher degree of organic solvent resistance is produced by a process which involves the reaction of aliphatic dihalides with alkali metal polysulphides to produce aliphatic polysulphides which may be polymerized to products having varying degrees of the desired characteristics. Materials falling in this class are commercially available under the trade name "Thiokol." However, although these materials have satisfied some commercial needs, improvements in their characteristics, especially in solvent resistance, heat resistance, mercaptan resistance and mechanical strength are desired for many applications. For example, there exists a demand for an oil-resistant elastomeric material which is both capable of being cast in liquid form and of sealing the pores and crevices of fuel tanks; this sealant, when made from now marketed materials, is deficient in resistance to aromatics and mercaptans and also lacks a favorable balance of properties, including tensile strength, flexibility and heat resistance.

Saturated polyester resins having rubber-like properties have been prepared by reacting dicarboxylic acid with polyhydric alcohols, e. g., adipic acid and ethylene glycol, and it has been suggested to combine sulfur into either the acid or acid and alcohol portion of such a polyester molecule. However, attempts at combining sulfur into unsaturated polyesters for the purpose of cross-linking them with olefins to obtain solvent-resistant elastomers having other desirable characteristics have been discouraged in the light of the known information that the introduction of sulfur in materials once capable of polymerization renders them more difficult or impossible to polymerize.

It is, therefore, an object of this invention to provide elastomeric compositions which are highly resistant to solvents and yet possess many of the desirable characteristics usually associated with polymers used for the purposes intended herein. A further object is to provide elastomeric compositions which are suitable for use as sealants, gaskets, tubings, coatings, binders, etc., and which are characterized by possessing the desirable properties usually required in elastomers in the preparation of these forms and shapes. A particular object of this invention is to make available in commerce compositions comprising a mixture of an unsaturated polyester and an olefinic cross-linking agent with or without the presence of catalysts, and/or inhibitors, and/or chain terminating agents, and/or promoters or accelerators, which are capable of polymerization to an insoluble solvent-resistant, elastomeric material, and are preferably in the liquid state when uncured. A further objective is to provide methods for the preparation of these unsaturated sulphur-containing polyesters and their combination with olefinic cross-linking agents. These objects and still others will become apparent to those skilled in the art on further consideration of our specification and claims.

These and related objects are accomplished by the present invention which provides new compositions of matter comprising a mixture of a linear polyester containing chemically-combined sulfur in the form of an

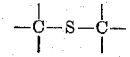

linkage, i. e., a mono-thio linkage in the acid component of the linear portion of the polyester molecule and at least one unsaturated linkage capable of copolymerization, and an olefinic type cross-linking agent therefor, said mixture forming a rubber-like elastomeric material when polymerized.

In accordance with this invention, the unsaturated linear polyester is composed of a polycarboxylic acid and a polyhydric alcohol and must contain a monothio linkage in the polycarboxylic acid unit of said polyester molecule. Such polycarboxylic acid units may be derived from polycarboxylic acids, polycarboxylic anhydrides, polycarboxylic halides, polycarboxylic esters, and mixtures thereof. The alkyd resin must contain some unsaturated bonds in order to enable it to copolymerize with the cross-linking agent, i. e., it must be an unsaturated alkyd resin. In accordance with this invention, the unsaturation is provided by effecting the polyesterification of the polycarboxylic acid and polyhydric alcohol, the acid component of which must contain the monothio linkage in the presence of a reactive and unsaturated chemical ingredient which retains its active unsaturation after being chemically-combined in the polyester chain.

The resinous compositions of this invention can be prepared by first effecting the esterification, including transesterification, of the selected polycarboxylic acids or their simple esters, e. g., alkyl esters, with the desired polyhydric alcohols in the presence of the reactive unsaturated chemical ingredient, whereby an unsaturated polyester is formed; then mixing the resulting composition with the chosen copolymerizable olefinic cross-linking agent; and thereafter copolymerizing the mixture to form an insoluble, rubber-like elastomeric cross-linked polyester resin. Esterification of the desired ingredients may be effected in the presence of esterification catalysts and/or chain terminating agents, etc. A preferred procedure involves introducing the selected ingredients to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water, alcohol or glycol of esterification, under vacuum if desired, an inlet, an outlet, and any other accessories necessary for the reaction. The charged reactants are blanketed with an inert atmosphere, then agitated and heated to effect the reaction for the specified period of time. The desired degree of reaction is sometimes conveniently determined by employing the acid and/or hydroxyl number technique when applicable, or measuring the amount of water, alcohol or glycol liberated, or determining the viscosity. The resulting product is then mixed with one or more olefinic cross-linking agents preferably in the presence of a polymerization inhibitor.

The processing techniques and the chemical reactions depicted herein for producing the necessary ingredients to be used in making the compositions of this invention are subject to various modifications, and the proportions of ingredients may also be varied without departing from our invention.

The temperature for carrying out the reaction between the polyhydric alcohols and polybasic acids or esters ranges from 100 degrees centigrade to 260 degrees centigrade, although higher or lower temperatures can be used; a preferred range is from about 130 degrees centigrade to 220 degrees centigrade.

In accordance with this invention, vacuum is employed during the latter stage of the esterification, or transesterification reaction to produce polyesters of very high molecular weight. A vacuum of 0.01 to 100 millimeters of mercury absolute may be employed at this stage with 0.05 to 60 millimeters being preferred.

An inert gas such as nitrogen is passed through the mixture in a preferred procedure to accelerate the progress of the reaction. The progress of the reaction is followed by measuring the rate of water, alcohol, or glycol liberated, by measuring the viscosity of the resin, by measuring its acid and/or hydroxyl number, or by other methods commonly known in the art. The extent to which the reaction is carried out will depend upon a number of factors, such as the desired viscosity, duration of reaction, etc.

Esterification or transesterification catalysts such as para-toluene sulfonic acid, benzene sulfonic acid, beta naphthalene sulfonic acid, etc., or amines such as pyridine, triethyl amine, quinoline, etc., or alkali or alkaline earth metals or their alkoxides, oxides hydrides, halides, etc., including sodium, potassium, sodium methoxide or sodium ethoxide, sodium hydride, lithium hydride or calcium hydride, and lead oxide, zinc borate or zinc chloride may be added to the reaction mixture.

When a moderately high molecular weight polyester is desired, the proportion of the polyhydric alcohol to the total mol proportion of acids or esters in the reaction mixture may be approximately equal. However, when a very high molecular weight polyester is desired, we prefer to charge the polyhydric alcohol in substantial mol excess, and remove the excess polyhydric alcohol in the latter stages of reaction by transesterification of the polyhydric alcohol ester formed.

A chain terminator may be added in any necessary amount in order to terminate the esterification process at such time as it is determined from the acid number that the linear chains have reached the desired length, in order to reduce the number of free carboxyl or hydroxyl groups, or in order to introduce a hydrocarbon terminal residue. Among the compounds which may be used as chain stoppers are a wide variety of monohydric alcohols such as butyl, hexyl, octyl, dodecyl, benzyl, tetrahydrofurfuryl, etc., or monobasic acids such as acetic, propionic, butyric, ethyl hexoic, benzoic, etc.

Alternatively linear polyester chains may be terminally linked by employing a di-isocyanate, di-acid chloride, di-amine, di-epoxy compound, etc., such as toluene di-isocyanate, fumaroyl dichloride, ethylene di-amine, diglycidyl ether, etc.

The solution or mixture of unsaturated polyester and olefinic cross-linking agent can be made either while the unsaturated polyester is still hot or when it has become cold, as illustrated among the examples. For instance the unsaturated polyester may be cooled and stored until ready for use at which time it may be reheated in order to facilitate solution in either the cold or preheated olefins. However, if there is any danger that the handling of the olefinic cross-linking agent at elevated temperatures might result in an explosion, or in premature self-polymerization even in the presence of polymerization inhibitors, the mixing process may be carried out in the cold.

In preparing the solution or mixture of this invention for reacting to the rubber-like insoluble polyester elastomer, the ratio of olefinic cross-linking agent or mixture of agents to the unsaturated polyester may be varied within the limits of each without departing from the scope of this invention as will be more fully described later. For example, only a small proportion of olefinic cross-linking agent is needed when the proportion of reactive cross-linkable olefinic bonds in the unsaturated polyester is very small; and a still smaller proportion of olefinic cross-linking agent may be employed if it is desired to react only a part of the total of said unsaturated bonds in such polyester in the cross-linking reaction. On the other hand, a major proportion of olefinic cross-linking agent to unsaturated polyester may be employed when the proportion of reactive cross-linkable olefinic bonds in the unsaturated polyester is high; and a still higher proportion of olefinic cross-linking agent will be required if it is desired to react a major part of the total of said unsaturated bonds in such polyester in the cross-linking reaction. In general, the concentration of the olefinic cross-linking agent in the unsaturated polyester may vary between about 5 and 95 percent. In certain formulations and in order to accentuate a large number of desirable properties in the polymerized rubber-like elastomeric polyester resin produced, we find it preferable to employ between about 10 and 90 percent of the olefinic cross-linking agent.

Polymerization inhibitors, usually of the order of 0.001 to 1 percent of the composition may be added to prevent premature polymerization. Among the inhibitors which may advantageously be employed to prevent the premature polymerization of the mixture of unsaturated polyester and olefinic cross-linking agents, particularly if the mixture is to be stored or shipped in commerce prior to curing, are substances such as a hydroquinone, benzoquinone, para-tertiary-butyl catechol, para-phenylene di-amine, trinitrobenzene, picric acid, etc.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, cumene hydroperoxide, dibenzal diperoxide, p-chlorobenzoyl peroxide, tert-butyl hydroperoxide, etc., have been found satisfactory as well as ultraviolet light, and certain ionic catalysts, e. g., boron trifluoride etherate, anhydrous zinc chloride and aluminum chloride, etc. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, cobalt resinate, cobalt maleate, cobalt naphthenate, etc., or by amines such as dibutyl amines, or mercaptans such as dodecyl mercaptan, etc. These are used in proportions similar or smaller to that stated for catalysts.

The polymerization conditions for effecting the cross-linking reaction between the unsaturated polyesters of this invention and the olefinic cross-linking agent may be selected from a wide variety of techniques, but usually involve the application of heat or light. Although pressure is not a required condition for effecting polymerization of the polymerizable mixtures embraced within this invention, it may be sometimes advantageously employed.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization.

The linear polyesters embraced within the scope of this invention can be rendered copolymerizable by chemically-combining in such polyester chains, a reactive and unsaturated chemical ingredient which retains its active unsaturation after its chemical combination into the polyester chain. Among the materials which may gainfully be employed for this purpose are the unsaturated polycarboxylic acids such as, maleic, fumaric, citraconic, itaconic, acetylene dicarboxylic and esters and halogen substituted derivatives thereof, etc.; the unsaturated polyhydric alcohols such as, butene-diol, pentene-diol, etc., also unsaturated hydroxy ethers such as, allyl or vinyl glycerol ethers, allyl or vinyl pentaerythritol ethers, etc.; and, still other chemical compounds comprising an ethylenic or an acetylenic linkage which are not rendered unreactive in the polyester chain by their chemical combination into the polyester chain by way of other functional groups, whereby the mixed esters are produced.

Among the polyhydric alcohols which may be employed in accordance with this invention are the saturated polyhydric alcohols, unsaturated polyhydric alcohols and mixtures thereof. When employing a saturated alcohol as the alcohol component of the compositions of this invention, it is necessary to provide for copolymerizable unsaturation by coesterifying said alcohol with an unsaturated chemical capable of entering the coesterification reaction such as given above. Among the saturated polyhydric alcohols which may be employed are ethylene glycol; diethylene glycol; propylene glycol; 1,6-hexanediol; glycerol; sorbitol; pentaerythritol; 1,4-butane diol; 1,5 pentane diol; etc. Among the unsaturated alcohols which may be employed are butene diol, pentene diol, also unsaturated hydroxy ethers such as allyl or vinyl glycerol ethers, allyl or vinyl pentaerythritol ethers, etc.

Among the polycarboxylic acids which may be employed in accordance with this invention are the saturated polycarboxylic acids, unsaturated polycarboxylic acids and either of these containing a mono-thio linkage and mixtures thereof these polycarboxylic acids may be utilized in the acid, anhydride, halide, or ester form. When employing a saturated acid as the acid component of the compositions of this invention, it is necessary to provide for copolymerizable unsaturation by coesterifying said acid with an unsaturated chemical capable of entering the coesterification reaction such as given above. The sulfur-containing component of this invention may be embodied in either a saturated or unsaturated polycarboxylic acid unit. Among the saturated polycarboxylic acids which may be employed are: malonic acid, succinic acid, glutaric acid, adipic acid, pimelic acid, suberic acid, azelaic acid, sebacic acid, benzene dicarboxylic acid, biphenyldicarboxylic acid, naphthalene dicarboxylic acid and cyclohexane dicarboxylic acid. Among the unsaturated acids which may be employed are: maleic acid, chloromaleic acid, bromomaleic acid, fumaric acid, chlorofumaric acid, bromofumaric acid, mesaconic acid, citraconic acid, itaconic acid and acetylene dicarboxylic. Among the sulfur-containing acids which may be employed are: 4-thiaheptanedioic acid (or thiodipropinoic acid); 4-thia-2,6-dimethylheptanedioic acid; 3,5-dithiaheptanedioic acid (or methylenedithio-diacetic acid (MDTA)); 3,6-dithiacoctanedioic acid (or ethylene dithiodiacetic acid); 4,7-dithiadecanedioic acid; 4,8-dithiaundecanedioic acid; 3,7-dithianonanedioic acid; 4,9-dithiadodecanedioic acid; 3,8-dithiadecanedioic acid; 6,9-dithiatetradecanedioic acid; 8,13-dithiacosanedioic acid; 4,6-dithia-5-(2-carboxyethylthio) nonanedioic acid; 5-(2-carboxyethylthio)-4,7-dithiadecanedioic acid; 4,7-dithia-5,6-(di-2-carboxyethylthio) decanedioic acid (or tetrakis (2-carboxyethylthio)ethane); ortho, meta, and/or para-alpha, alpha'-xylylene dithiodiacetic acid;

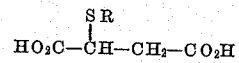

where R may be an alkyl group or an alkyl carboxylic acid group; for example, 2-(methylthio)succinic acid; 2-(thioglycollic)succinic acid; 4,7 - dithia-2,9-dimethyldecanedioic acid; 3,6-dithiaoctenedioic acid; 3,7-dithianonenedioic acid and 3,8-dithiadecenedioic acid.

It should be noted that although the acids only have been listed above, this invention embraces the use of the simple alkyl esters, acid chlorides, and/or anhydrides corresponding to and/or derived from these acids.

Among the unsaturated cross-linking agents which may be advantageously employed in accordance with this invention are the various mono-, di-, and polyunsaturated olefinic type compounds such as the simple alkyl esters of acrylic and methacrylic acids, e. g., methyl acrylate, ethyl acrylate, methyl methacrylate, ethyl methacrylate, butyl acrylate, etc.; vinyl acetate, acrylonitrile; allyl esters of mono- or dicarboxylic acids, e. g., diallyl maleate, diallyl fumarate, diallyl phthalate, etc.; allyl diglycol carbonate; biallyl; styrene; divinylbenzene; vinyl pyridines, e. g., 2-vinyl pyridine; 3-vinyl pyridine, 4-vinyl pyridine, 2-methyl-5-vinyl pyridine, etc.; chlorostyrenes, e. g., mono-, di-, or polychlorostyrenes, etc.; 3,6-dithia-1,7-octadiene; 3-oxa-6-thia-1,7-octadiene; 3,6,9-trithia-1,10-undecadiene; 3,5-dithia-1,6-heptadiene; 3-oxa-6,9-dithia-1,10-undecadiene; 3,-5-dioxa-7-thia-1,8-nonadiene; 3-oxa-5,7-dithia-1,8-nonadiene; 1,4-bis (vinyl mercapto) benzene; 3,6,9-trithia-1,10-undecadiene.

In many instances it is preferable to use a mixture of more than one of the above listed unsaturated cross-linking agents, because we have found that a wider range of superior physical properties of the polymerized elastomers result therefrom, and also because a wider range of superior properties, e. g., viscosity, gel-time, etc., of the uncatalyzed mixture of linear polyester and monomeric cross-linking agents result therefrom.

The following examples are given to further illustrate the novel features of the invention but are not to be construed as limiting, except as defined in the appended claims. Examples 1 to 8 illustrates the preparation of the linear polyester using methylene dithiodiacetic acid and are presented to show the various modifications which may be obtained by varying the operating conditions, etc., when using a preferred species embraced within our invention.

EXAMPLE 1

One hundred ninety-six parts (1.0 mol) of methylene dithiodiacetic acid (hereinafter called MDTA), 20.7 parts (0.166 mol) of diethyl fumarate, 79.5 parts (1.282 mol) of ethylene glycol, and 0.15 part (0.05 percent) of litharge (PbO) were charged into an esterification or resin vessel provided with heating and/or cooling means, means for maintaining a vacuum, an agitator fitted with means for operating under vacuum, means for maintaining an atmosphere of an inert gas over the reaction mixture, means for removing water, alcohol and glycol during the reaction; temperature recording means; charging inlets and outlets; etc. The temperature of the mixture was maintained at about 140 degrees centigrade for about 17 hours, at which time it was increased to 160 degrees centigrade and held 5 hours. A vacuum of 58 millimeters of mercury absolute was applied after 22 hours and at the 23rd hour the temperature was raised to about 171 degrees centigrade for one hour at which time the temperature was raised to 180 degrees centigrade and maintained for 16 hours. The vacuum during the last major portion of these 16 hours was 25 millimeters absolute. The water and alcohol formed by the reaction were separated and the acid number of the reaction mixture was measured after 19 hours and found to be about 35 and the viscosity of the reactants was observed from time to time. The reaction mixture was poured into a dish and allowed to cool to room temperature. A dark, rubber-like linear polyester was obtained. The polyester was not brittle when placed in a refrigerator maintained at minus 23 degrees centigrade.

EXAMPLE 2

Three hundred ninety-two parts (2.0 mol) of MDTA, 114.8 parts (0.667 mol) of diethylfumarate; 165.5 parts (2.667 mol) of ethylene glycol; and 0.3 part (0.05 percent) of litharge were charged into an esterification or resin vessel provided with heating and/or cooling means, an agitator, means for maintaining atmosphere of an inert gas over the reaction mixture, means for removing the water and alcohol during the reaction, temperature recording means, charging inlets and outlets, etc. The temperature of the mixture was maintained at about 140 degrees centigrade for about 24 hours, at which time it was increased to 155 degrees centigrade and held for about 45 hours and then raised to 160 degrees centigrade for about 4 hours. The water and alcohol formed by the reaction were separated and the viscosity observed. The acid number at this point was measured and found to be about 48. The hot reaction mixture was poured into a dish and allowed to cool to room temperature. A yellow, highly viscous linear polyester was obtained.

EXAMPLE 3

One hundred twenty-four and one-tenth parts (2 mol) of ethylene glycol, 294.0 parts (1.5 mol) of MDTA, 86.1 parts (0.5 mol) of diethylfumurate, and 0.5 part (0.1 percent) of litharge were reacted in a vessel similar to that of Example 2 at about 140 degrees centigrade for about 22 hours, at which time the temperature was raised to 150 degrees centigrade and maintained for about 28 hours. The mixture had an acid number of about 15.5. The reaction mixture was poured into a dish and allowed to cool to room temperature. The resultant linear polyester was olive in color.

EXAMPLE 4

In an apparatus similar to that used in Example 2, 19.4 parts (0.166 mol) of fumaric acid and 41.4 parts (0.667 mol) of ethylene glycol were heated together at 140 degrees centigrade until a complete solution was effected and then 98 parts (0.5 mol) of MDTA were added and the recreation was continued at 140 degrees centigrade. After 90 hours the acid number was measured and found to be 31. The hot reaction mixture was poured into a dish and allowed to cool to room temperature. The product linear polyester was an orange-tan viscous liquid and when placed in a refrigerator maintained at minus 20 degrees centigrade it did not become brittle.

Table 1 shows the results of Examples 1–4 in tabular form and the results of additional examples showing some of the modifications in properties of a linear polyester containing MDTA which can be obtained in accordance with this invention. In Table 1, methylene dithiodiacetic acid is abbreviated as "MDTA" as it is in the examples.

Examples 9 to 12 show the addition of a cross-linking agent to the linear polyester to form a mixture stable against polymerization.

EXAMPLE 9

One hundred parts of the linear polyester formed from Example 1 were mixed with 30 parts of 2-methyl-5-vinylpyridine, 40 parts of styrene and 0.085 part (0.05 percent) of a hydroquinone. The resultant solution was a dark pourable liquid stable against polymerization on long standing.

EXAMPLE 10

One hundred parts of the linear polyester formed from Example 1 were mixed with 40 parts of 4-vinyl pyridine, 40 parts of styrene and 0.09 part (0.05 percent) of a hydroquinone. The resultant solution was a dark easily pourable liquid stable against polymerization on long standing.

EXAMPLE 11

One hundred parts of the linear polyester formed from Example 2 were mixed with 30 parts of 2-methyl-5-vinyl pyridine, 35 parts of styrene and 0.068 part (0.04 percent) of a hydroquinone. The resultant solution was clear, very fluid, amber in color and was stable against polymerization on long standing.

EXAMPLE 12

One hundred parts of the linear polyester formed from Example 3 was mixed with 25 parts of styrene containing p-tertiary butyl catechol as a polymerization inhibitor. The resultant solution was an olive-colored, translucent fluid liquid stable against polymerization on long standing.

Examples 13 to 25 show the cross-linking of the linear polyester by addition polymerization.

EXAMPLE 13

The solution from Example 9 was mixed with 0.5 percent of a liquid material containing 60 percent methyl ethyl ketone peroxide as the active ingredient in dimethyl phthalate (hereinafter called MEK), poured into trays

*Table 1*

PREPARATION OF A LINEAR POLYESTER CONTAINING METHYLENE DITHIODIACETIC ACID

| Example Number | Molar Ratios | | | | Catalyst and its Weight percent | Parts of MDTA Charged | Temp., °C. | Time | | Acid Number | Color of Resultant Linear Polyester |
|---|---|---|---|---|---|---|---|---|---|---|---|
| | MDTA | Fumaric Acid | Diethyl Fumarate | Ethylene Glycol [1] | | | | Hours | Total | | |
| 1 | 6 | | 1 | 7 | 0.05% litharge | 196.0 | 140 / 160 / 170 / 180 | 17 / 5 / 1 / 16 | 39 | 35 | Dark. |
| 2 | 6 | | 1 | 7 | 0.05% litharge | 392.1 | 140 / 155 / 160 | 24 / 45 / 4 | 73 | 48 | Yellow. |
| 3 | 3 | | 1 | 4 | 0.1% litharge | 249.0 | 140 / 150 | 22 / 28 | 50 | 15.5 | Olive. |
| 4 | 3 | 1 | | 4 | | 98.1 | 140 | | 90 | 31 | Orange-tan. |
| 5 | 3 | 1 | | 4 | | 98.1 | 150 | | 48 | 39 | Do. |
| 6 | 3 | 1 | | 4 | | 196.2 | 150 | | 72 | 60 | Orange-brown. |
| 7 | 3 | 1 | | 4 | | 147.0 | 130 | | 140 | 36 | Do. |
| 8 | 3 | 1 | | 4 | | 147.0 | 140 | | 65 | 35 | Orange-tan. |

[1] Mole ratio believed to be present at the end of the reaction.

and cured in an oven at 80 degrees centigrade for 23 hours. The resultant castings were very flexible and rubbery.

EXAMPLE 14

The solution from Example 10 was mixed with 0.5 percent of MEK, poured into a 30 cc. size test tube and heated to 50 degrees centigrade. Gelation occurred in 45 minutes and after post-curing at 80 degrees centigrade, the elastomer contained therein was tough and flexible.

EXAMPLE 15

The solution from Example 11 was mixed with 0.5 percent MEK, poured into a greased aluminum tray used as a mold, the top of which was then covered with glass, and placed in an oven maintained at 50 degrees centigrade. Gelation occurred within an hour, and one hour after gelation the temperature was raised to 80 degrees centigrade and maintained thereat for 24 hours. The resultant cross-linked castings were tough, flexible elastomers.

EXAMPLE 16

The solution from Example 12 was mixed with 1.0 percent of a paste of 50 percent dibenzaldiperoxide in tricresyl phosphate. Samples of this mixture were immersed into a water bath maintained at 50 degrees centigrade, whereupon gelation occurred within 30 minutes, and after 2 hours in the water bath at 50 degrees centigrade, the samples were post-cured in an oven maintained at 80 degrees centigrade. A rubber-like substance was produced.

Table 2 shows the results of Examples 13–16 in tabular form and the results of additional selected examples showing some of the modifications in properties of the resulting cross-linked polyester containing MDTA which can be obtained in accordance with this invention. In Table 2, the abbreviations used signify the following: "Ex. No.," example number; "P. E.," linear polyester; "C. L.," cross-linking agent(s); "Wt.," weight; "Cat. Conc.," catalyst concentration; "Temp.," temperature; "MEK," a liquid material containing 60 percent methyl ethyl ketone peroxide as the active ingredient in dimethyl phthalate. The weight ratios given in the fourth column of Table 2 refer respectively to the linear polyester, the second column, the first-recited cross-linking agent of the third column, and if any, the second-recited cross-linking agent of the third column of each of the examples.

Thus, from a consideration of the preceding examples, which all use methylenedithio diacetic acid, many modifications and variations in the resultant linear polyester and cross-linked polyester elastomer can be attained. In addition, by using other acids containing a thio linkage, or by employing a cross-linking agent having a thio linkage, or mixtures thereof, other modifications and variations in the sulfur-containing polyester elastomers of our invention can be obtained. These modifications and variations are illustrated by the following examples but are not to be construed as limiting except as defined in the appended claims.

*Table 2*

CROSS-LINKING OF THE LINEAR POLYESTER CONTAINING METHYLENE DITHIODIACETIC ACID BY ADDITION POLYMERIZATION

| Ex. No. | Source of P. E., Ex. No. | Cross-Linking Agent(s) C. L. | Wt. Ratio, P.E./C.L. | Catalyst | Cat. Conc., percent | Curing Temp.(s), °C. | Results |
|---|---|---|---|---|---|---|---|
| 13 | 1 | 2-Methyl-5-Vinyl Pyridine and Styrene. | 10/3/4 | MEK | 0.5 | 80 | Very flexible, rubbery elastomer. |
| 14 | 1 | 4-Vinyl pyridine and Styrene. | 5/2/2 | MEK | 0.5 | 50 | Tough flexible elastomer. |
| 15 | 2 | 2-Methyl-5-Vinyl pyridine and Styrene. | 20/6/7 | MEK | 0.5 | 50–80 | Tough flexible elastomers. |
| 16 | 3 | Styrene | 4/1 | 50% Dibenzaldiperoxide in tricresylphosphate. | 1.0 | 50–80 | Rubber-like substance. |
| 17 | 5 | Ethylacrylate | 2/1 | 50% Benzoyl peroxide in tricresylphosphate. | 2.0 | 50–80 | Milky-white elastomer. |
| 18 | 6 | Diallyl maleate | 5/3 | Cobalt solution and MEK. | 1.0 / 1.0 | 50–120 | Weak rubber-like material. |
| 19 | 2 | Divinyl benzene | 10/3 | 50% Dibenzaldiperoxide in tricresylphosphate. | 1.0 | 80 | Somewhat hard, brittle solid. |
| 20 | 2 | Acrylonitrile | 100/35 | do | 1.0 | 50–90 | Somewhat weak elastomer which contained some bubbles. |
| 21 | 1 | 2-Methyl-5-Vinyl pyridine and Acrylonitrile. | 100/30/21.6 | MEK | 1.0 | 50–80 | Somewhat stiff elastomer. |
| 22 | 1 | 2-Methyl-5-Vinyl pyridine and Ethyl acrylate. | 100/30/32 | MEK | 1.0 | 50–80 | Flexible elastomer. |
| 23 | 1 | 2-Methyl-5-Vinyl pyridine and Vinyl acetate. | 100/30/23.1 | MEK | 1.0 | 50–80 | Weak, rubber-like material. |
| 24 | 1 | 2-Methyl-5-Vinyl pyridine and Allyl diglycolcarbonate. | 100/30/27 | MEK | 1.0 | 50–80 | Do. |
| 25 | 1 | 2-Vinyl pyridine and Styrene. | 5/2/2 | MEK | 0.5 | 50–80 | Flexible, somewhat cloudy elastomer. |

EXAMPLE 26

In an apparatus similar to that used in Example 1, 206.0 parts (1.0 mol) of methyl-β-thiodipropionate, 28.7 parts (1.66 mol) of diethyl fumarate, 79.5 parts (1.282 mol) of ethylene glycol and 0.16 part (0.05 percent) of litharge were heated for 46 hours at 140 degrees centigrade, at which time the temperature was raised and maintained at 160 degrees centigrade for 19 hours, and then raised and maintained at 190 degrees centigrade for 57 hours. A vacuum of 3 millimeters' mercury absolute was then applied and the temperature raised and maintained at 190 degrees centigrade for 18 hours and then raised and maintained at 200 degrees centigrade for 7 hours. The reaction mixture was poured into a dish, allowed to cool at room temperature. The final product polyester was a dark viscous liquid having a slight odor.

The sulfur-containing polyesters of this invention are elastomers which exhibit unusual solvent and chemical resistance as well as having desirable physical properties. These qualities are further illustrated by the following examples but are not to be construed as limiting.

EXAMPLE 27

Samples of the linear polyester produced in Example 1 were placed in the following liquids and after being immersed at room temperature for two weeks with occasional shaking, the linear polyester from Example 1 was found to be insoluble in the following substances: water, ethanol, methanol, benzene acetone, ethyl acetate, carbon disulfide, carbon tetrachloride, thiodiglycol and petroleum ether. The linear polyester was completely soluble in pyridine and in large amounts of chloroform. The viscosity of a 50 percent pyridine solution of this linear polyester was 25 poises at 23 degrees centigrade corresponding to J on the Gardner scale.

EXAMPLE 28

Samples of the cross-linked polymer of Example 16 (having a Shore hardness of about 90) were prepared and tested in accordance with ASTM test No. D543–43. After immersion of the test samples in a mixture of 70 parts 100-octane aviation fuel and 30 parts xylene for thirty days at 23 degrees centigrade, these samples gained 0.8 percent in weight and showed no measurable swelling or other physical change. In 10 percent sodium dichromate solution the polymer of Example 16 gained 2.7 percent in weight and showed up to 1.5 percent swelling after thirty days at 23 degrees centigrade. No physical change was apparent. The same polymer gained approximately one percent in weight after thirty days at 23 degrees centigrade in a 10 percent aqueous sodium chloride solution and exhibited no measurable swelling or other physical change.

EXAMPLE 29

Samples of the cross-linked polymer of Example 15 (having a Shore hardness of about 97–98) were prepared and tested in accordance with ASTM Test No. D412–51T. Tensile strength exhibited by this material was 1356 p. s. i.; elongation at the break point was about 105 percent.

We claim:

1. A new composition of matter comprising a polymerizable mixture of (A) a linear polyester and (B) a vinylidene monomer copolymerizable therewith; wherein (A) comprises the reaction product of (a) a polyhydric alcohol, (b) a polycarboxylic compound selected from the group consisting of polycarboxylic acids, polycarboxylic acid anhydrides, polycarboxylic acid halides, polycarboxylic acid esters, and mixtures thereof, and (c) a monothio-linkage-containing polycarboxylic compound selected from the group consisting of polycarboxylic acids, polycarboxylic acid anhydrides, polycarboxylic acid halides, polycarboxylic acid esters, and mixtures thereof, at least one of (a), (b), and (c) containing an aliphatic unsaturated carbon to carbon linkage rendering (A) capable of copolymerization with (B).

2. A composition of claim 1 when polymerized to a rubber-like elastomeric material.

3. A composition of claim 1 wherein the polycarboxylic compound (b) contains the unsaturation rendering (A) capable of copolymerization with (B).

4. A composition of claim 1 wherein the polyhydric alcohol (a) is selected from the group consisting of alcohols, hydroxy ethers and mixtures thereof.

5. A composition of claim 1 wherein the polyhydric alcohol (a) contains the unsaturation rendering (A) capable of copolymerization with (B).

6. A composition of claim 1 wherein (c) is selected from the group consisting of methylene dithiodiacetic acid, ethylene dithiodiacetic acid and thiodipropionic acid.

7. A composition of claim 1 wherein (B) is selected from the group consisting of 2-methyl-5-vinyl pyridine, 4-vinyl pyridine, and 2-vinyl pyridine.

8. A composition of claim 7 having another polymerizable vinylidene monomer added thereto.

9. A new composition of matter comprising a polymerizable mixture of (A) a linear polyester and (B) a vinylidene monomer copolymerizable therewith selected from the group consisting of 2-methyl-5-vinyl pyridine, 4-vinyl pyridine and 2-vinyl pyridine; wherein (A) comprises the reaction product of (a) a polyhydric alcohol (b) a polycarboxylic compound selected from the group consisting of polycarboxylic acids, polycarboxylic acid anhydrides, polycarboxylic acid halides, polycarboxylic acid esters and mixtures thereof, and (c) a polycarboxylic compound selected from the group consisting of methylene dithiodiacetic acid, ethylene dithiodiacetic acid and thiodipropionic acid; at least one of (a) and (b) containing an aliphatic unsaturated carbon to carbon linkage rendering (A) capable of copolymerization with (B).

10. A composition of claim 9 having another polymerizable vinylidene monomer added thereto.

11. A composition of claim 9 when polymerized to a rubber-like elastomer material.

12. A composition of claim 10 when polymerized to a rubber-like elastomer material.

References Cited in the file of this patent

UNITED STATES PATENTS

| | | |
|---|---|---|
| 2,260,005 | D'Alelio | Oct. 21, 1941 |
| 2,288,315 | D'Alelio | June 30, 1942 |

FOREIGN PATENTS

| | | |
|---|---|---|
| 622,235 | Great Britain | Apr. 28, 1949 |